Figure 1:
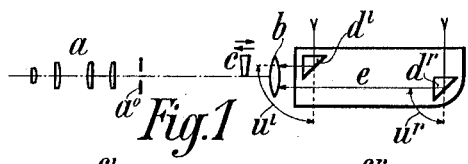

O. EPPENSTEIN.
OPTICAL COMBINATION.
APPLICATION FILED SEPT. 22, 1909.

993,667.

Patented May 30, 1911.
2 SHEETS—SHEET 1.

Witnesses:
Paul Krüger
Fritz Sander

Inventor:
Otto Eppenstein

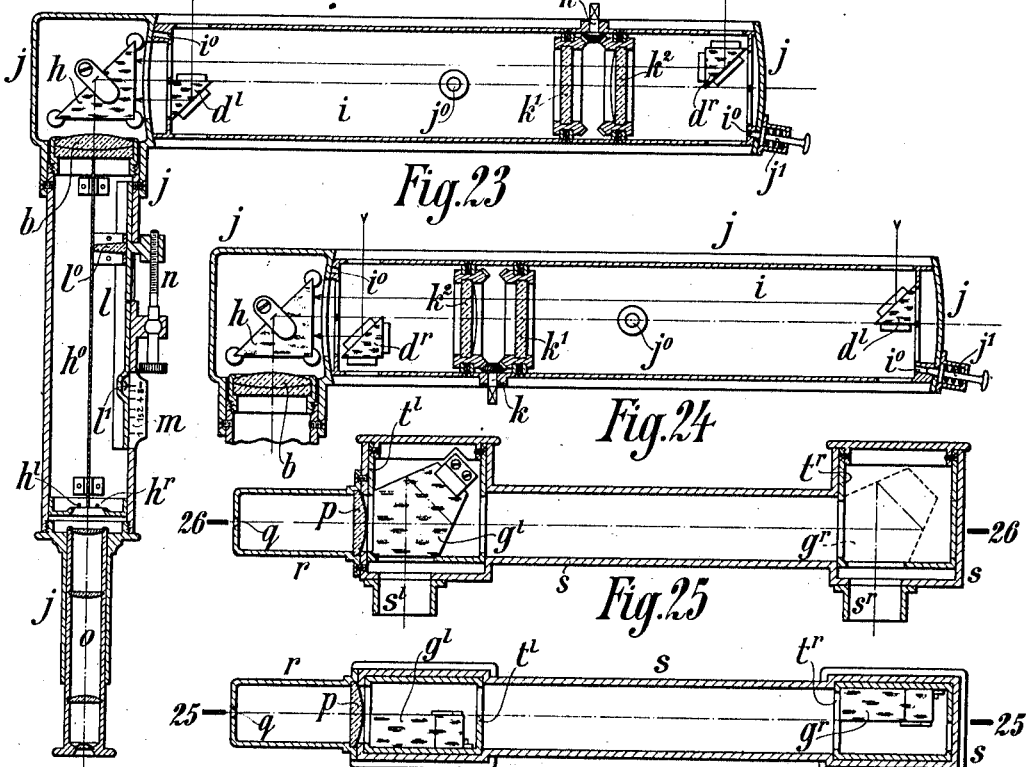

UNITED STATES PATENT OFFICE.

OTTO EPPENSTEIN, OF JENA, GERMANY, ASSIGNOR TO THE FIRM OF CARL ZEISS, OF JENA, GERMANY.

OPTICAL COMBINATION.

993,667.  Specification of Letters Patent. Patented May 30, 1911.

Application filed September 22, 1909. Serial No. 518,974.

*To all whom it may concern:*

Be it known that I, OTTO EPPENSTEIN, a citizen of the German Empire, residing at Carl-Zeiss strasse, Jena, in the Grand Duchy of Saxe-Weimar, Germany, have invented a new and useful Optical Combination, of which the following is a specification.

The invention relates to a well known combination of a front system of plane reflectors with two hinder telescope systems. The system of plane reflectors of that combination brings two parallel pencils of parallel rays to a smaller or larger distance between each other than that in which they impinge on the combination. Each of the two telescope systems receives one of the pencils. The system of plane reflectors is always so arranged that its members have the same principal plane of reflection, which term should be understood to denote that plane to which the pencil, both when entering the member and when emerging from it, is parallel. For the members of the reflecting system different forms are used: firstly, a simple reflecting surface—usually embodied in an isosceles right angled prism having a totally reflecting hypotenusal surface—secondly, a group or two or three reflecting surfaces having together a constant angle of deflection of 90°—usually realized by an optical square prism. In the members of the reflecting system, a simple reflecting surface is often replaced by a ridge surface for the purpose of influencing the position of the image. The number of the members of the reflecting system is two or four. In most cases, the system is composed of members of the same kind. As to the system of two members, two different arrangements are to be distinguished. In the one arrangement not only the distance between the two pencils is altered, they also undergo a final change of direction corresponding to a rotation by 90°. The two members of this reflecting system have the same direction and may therefore be called a pair of members. Each member receives one of the pencils and deflects it by 90°, the final distance between the pencils being determined by the distance as selected between the two members in the original direction of the pencils. In the second arrangement of the reflecting system of two members, these two members have opposite direction. One pencil is only exposed to the action of its telescope system. The other pencil is deflected by the two members successively, each time by 90°, at first in one, thereafter in the opposite direction. In this second case, the two members of the reflecting system, because of their coöperation, may be called a double member. The final direction of the twice deflected pencil is parallel to the original one, and the amount of enlargement or diminution of the distance between the pencils is determined by the distance the two members have between each other in the direction of the pencil passing from one to the other member. If the distance between the pencils is enlarged or diminished only partly with the one pencil, but for the rest with the other pencil by means of a second double member, the reflecting system of four members has been made use of. This system hence displaces one pencil to one side by means of one double member and the other pencil to the other side by means of the other double member. The sum of the two displacements represents the enlargement of the diminution of the distance between the pencils. No other arrangement of the reflecting system of four members requires practical consideration. The two telescope systems may have more or less components in common. When their two image fields lie closely together or even one in the other, the ocular is common to both. When in addition thereto, the objectives of the two systems lie closely together, they are in most cases constructed as halves of a single objective.

To the optical combination as considered, all these telemeters belong, the objectives of which having the axes parallel either lie together with less distance between them than the length of the base line amounts to or are united into a single objective. The system of plane reflectors reduces the distance between the two pencils, which is originally equal to the length of the base line, to that amount in which they can enter the objectives or the single objective. All of the three forms of the reflecting system—the two of two members and that of four members—are in use with the said telemeters. The combination of the two telescope systems with a front system of plane reflectors in any one of its three forms is further produced, when the adjusting device, the most important constructions of which are described in the German specification 165510, is placed in front of any telemeter containing the base line, for example, of one of the kind just referred to. The system of plane reflectors of this adjusting device enlarges the distance between the two pencils to the length of the base line. It is the reflecting system of the combination here dealt with, and the reflecting system which might be employed in the telemeter should only be considered as supplemental to the two telescope systems of the telemeter.

Through the action of the reflecting system, the pencils are, in general, not again directed exactly parallel. Behind the reflecting system, they have therefore a slight inclination to each other. This small deviation, reduced to the principal plane of reflection, may be called error of reflection.
When the reflecting system consists of a pair of members or a double member, the error of reflection is equal to the difference of deflection of the pair of members or the double member, that is to say, equal to the difference of the angles, by which the two members deflect the incident pencils. When the reflecting system is composed of two double members, the error of reflection is equal to the algebraic difference of the differences of deflection of one and the other double member. In order to enable the telemeters and the adjusting device, to comply with their purposes in a perfect manner, the error of reflection must be invariable and that for the following reason. With all forms of the combination as considered, the pencils are induced to form each a real image point in one and the other ocular field of the telemeter respectively.
The distance between these two image points, measured in the direction of the base line, is a standard for adjusting the telemeter. But when the error of reflection changes, this distance varies correspondingly, whereby the telemeter or the adjusting device itself is deranged.

As experience has shown, the reflecting system accomplishes in none of its forms the requirement of invariability of the error of reflection. There takes place a gradual alteration of this error, one time in one direction, another in the other direction. When in a system of two members simple reflecting surfaces are employed as members, the change results from a slow alteration of the angle formed by the two reflecting surfaces of the pair of members or the double member. When the members consist of groups of reflecting surfaces, in each group the angle between neighboring reflecting surfaces varies slowly, hence also the angle of deflection proper to this group, but in general in one group of the pair of members or the double member to another extent than in the second group. Similarly,
in reflecting systems composed of two double members, the change of the difference of deflection is in general different with the one and with the other double member, so that also the error of reflection, being the algebraic difference of the two differences of deflection, varies. No means have become public to obviate the rise of slow variations of the error of reflection.

The object of the present invention is to render the alteration of the error of reflection, when arisen, capable of being ascertained in a simple manner as to both sign and magnitude. For this purpose the members of the system of plane reflectors are mounted in such a manner that they can be re-arranged so as to produce an error of reflection of the same absolute value as in the former case, but of opposite sign. After such re-arrangement the pencils converge by as much as they previously diverged, or inversely. On first employing the one arrangement of the members of the system, and then immediately—that is to say, before the gradual alteration of the error of reflection has had time to become perceptible—employing the second arrangement, the difference between the distances apart of the above mentioned image points, the distance observed before the re-arrangement and the distance observed after the re-arrangement, corresponds to an algebraic difference of the angle between the pencils in the first case and the angle between the pencils in the second case, which is twice as great as the error of reflection, the latter being equally great in either case. The one arrangement of the system of plane reflectors being given, then the mounting of the reflectors which allows of a re-arrangement with the effect above stated differs in general according as the system consists of a pair of members, a double member or two double members, and it further differs according as simple reflecting surfaces or groups of such surfaces represent the members. In some cases, several arrangements are possible, particularly when a change in the position of the incident pencils is admitted.

Figure 2:
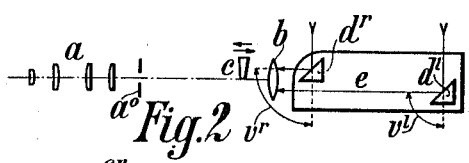
Figure 3:
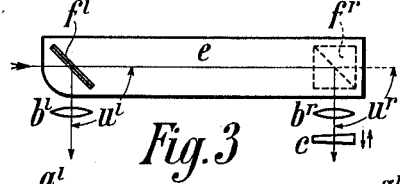
Figure 4:
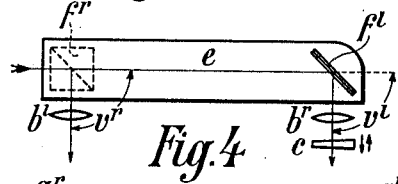

In the annexed drawing: Figure 1 is a diagrammatic plan view of a telemeter comprising the combination as improved by the present invention, the reflecting system being formed by a pair of members. Fig. 2 is a diagram of the same telemeter after the reflecting system has been re-arranged. Fig. 3 is a diagram of a form of the improved combination, which comprises an adjusting device and a telemeter, the former consisting of a reflecting system formed by a pair of members and the latter being represented by its front parts only. Fig. 4 is a diagram of the same combination after the adjusting device has been re-arranged. Fig.

Figure 7:
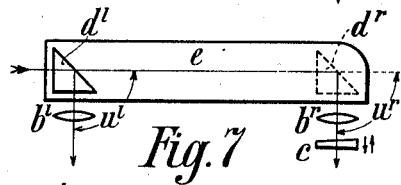
Figure 8:
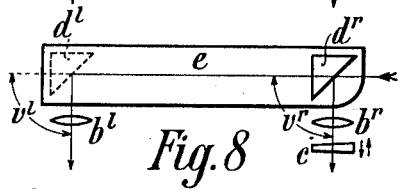
Figure 9:
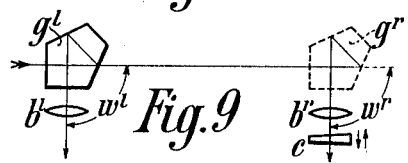
Figure 10:
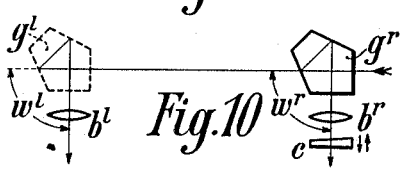
Figure 11:
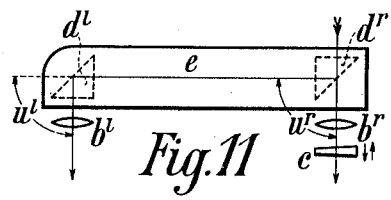
Figure 12:
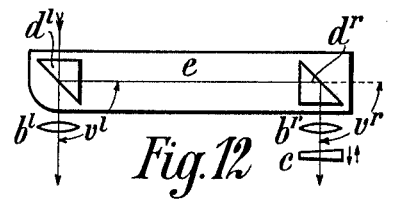
Figure 13:
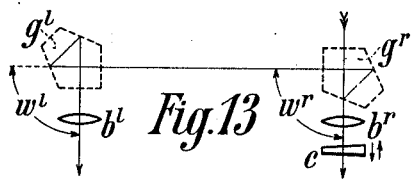
Figure 14:
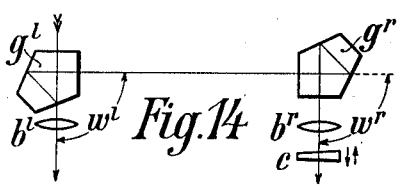
Figure 15:
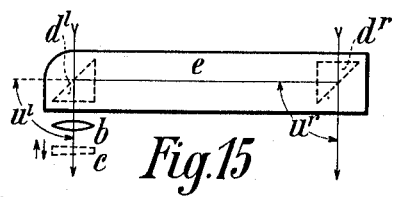
Figure 16:
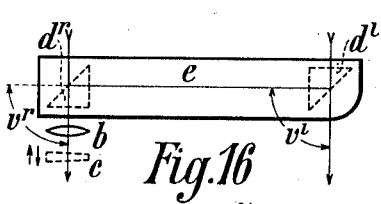

5 is a diagram of a combination similar to that of Figs. 3 and 4. Fig. 6 is a diagram of the same combination after re-arrangement. Fig. 7 is a diagram of a combination similar to that of Figs. 3 and 4. Fig. 8 is a diagram of the same combination after re-arrangement. Fig. 9 is a diagram of a combination similar to that of Figs. 3 and 4. Fig. 10 is a diagram of the same combination after re-arrangement. Fig. 11 is a diagram of a combination differing from those of Figs. 3 to 10 in that the reflecting system is formed by a double member. Fig. 12 is a diagram of the same combination after re-arrangement. Fig. 13 is a diagram of a combination similar to that of Figs. 11 and 12. Fig. 14 is a diagram of the same combination after re-arrangement. Fig. 15 is a diagram of a telemeter comprising the improved combination, the hinder parts being omitted and the reflecting system formed by a double member. Fig. 16 is a diagram of the same telemeter after re-arrangement. Fig. 17 is a diagram of a combination similar to that of Figs. 11 and 12. Fig. 18 is a diagram of the same combination after re-arrangement. Fig. 19 is a diagram of a combination differing from those of Figs. 3 to 14 and Figs. 17 and 18 in that the reflecting system is formed by two double members. Fig. 20 is a diagram of the same combination after re-arrangement. Fig. 21 is a diagram of a telemeter comprising the improved combination, the hinder parts being omitted and the reflecting system formed by two double members. Fig. 22 is a diagram of the same telemeter after re-arrangement. Fig. 23 is an axial section through a telemeter comprising the improved combination, the reflecting system being formed by a pair of members. Fig. 24 is the same section after re-arrangement, the hinder part of the telemeter being broken away. Fig. 25 is an axial section through an adjusting device adapted to be placed in front of a telemeter so as to form the improved combination. Fig. 26 is the same section after re-arrangement.

In the telemeter of Figs. 1 and 2 a terrestrial ocular $a$ is common to both telescope systems, whereas one half of the objective $b$ appertains to one and the other to the other telescope system. The measuring device which belongs to one telescope system is indicated by the sliding refracting prism $c$, which is arranged behind the half objective of this telescope system. The two image fields lie in each other, their locus being indicated by the diaphragm $d^o$. The reflecting system embodies the base line of the telemeter and is formed by a pair of members, the members $d^l$ and $d^r$ of which are isosceles right angled prisms which reflect totally. The two prisms $d^l$ and $d^r$ are fixed in a common casing $e$ having entrance openings on both sides. From the arrangement of Fig. 1, that of Fig. 2 is attained by changing the position of the prism casing $e$ with the effect of a rotation by 180° in the principal plane of reflection (in the plane of the drawing). The two pencils impinging on the prisms with parallel rays and with a distance between each other equal to the length of the base line are represented each by a single ray. According to Fig. 1, the prism $d^l$ deflects the left pencil by the angle $u^l$, the prism $d^r$ the right one by the angle $u^r$. Hence the error of reflection amounts to $u^l - u^r$. In the second arrangement, Fig. 2, the left pencil is deflected through $d^r$ by $v^r$ and the right one through $d^l$ by $v^l$. The error of reflection is therefore $v^r - v^l$. When $u^l > u^r$, in Fig. 1 the two pencils enter their halves of the objective with divergent principal rays. As in that case at the same time $v^l > v^r$, in Fig. 2 the two pencils enter their halves of the objective with convergent principal rays. When, inversely, $u^r > u^l$ and in consequence thereof $v^r > v^l$, convergence occurs in Fig. 1, but divergence in Fig. 2. The two errors of reflection $u^l - u^r$ and $v^r - v^l$ have unlike signs in both cases. Moreover, according to the law of reflection, each of the two errors of reflection is twice as great as the difference in direction of the two reflecting surfaces. The two errors of reflection are thus of equal value, having only opposite directions, i. e., unlike signs. Hence, the second arrangement of the reflecting system $d^l\ d^r$ accomplishes the above stipulated condition. With the reflections in Fig. 2, where the pencils impinge externally on the reflecting surfaces of the prisms $d^l\ d^r$, the greater portion of the light is lost by entering the prisms. The two image points, which are produced in the plane of the diaphragm $a^o$ from the pencils proceeding from an infinitely distant object point, have thus a comparatively low luminosity. On that account, the arrangement of the system of plane reflectors according to Fig. 1 is to be employed in measuring distances and the arrangement according to Fig. 2 only in controlling the error of reflection.

In the combination according to Figs. 3 and 4, the pair of members consists again of simple reflecting surfaces. The telemeter is indicated by its two objectives $b^l$ and $b^r$ and the sliding refracting prism $c$ of its measuring device. In place of the reflecting prisms of the first example, which in one arrangement act with total reflection, but in the other only to a small extent, here two reflecting structures are made use of, which present equally great reflections in both arrangements of the system. The member $f^l$ consists of two plano-parallel plates, the member $f^r$ of two isosceles right angled reflecting prisms. In both members, the two like parts are connected together with the silver coatings in contact, or a single layer of silver or a stratum of air is provided between the two parts. The incident pencils having parallel rays proceed from a collimator or a distant object point and travel closely one above the other, as indicated by one arrow line, but which has a double feather. The member $f^l$ receiving the lower pencil is arranged level with the lower halves of the objectives. The member $f^r$ receiving the upper pencil is arranged level with the upper halves of the objectives, $f^r$ being for this reason in the figures, which might be considered as horizontal sections through the plane of the objective axes, shown by dotted lines. The casing $e$ is provided with exit openings on both sides. The difference between the two arrangements of the reflecting system, the arrangement of Fig. 3 and that of Fig. 4, corresponds again to a rotation by 180° in the principal plane of reflection. Hence, in this case likewise the proof is applicable, given for the pair of members consisting of simple reflecting surfaces according to Figs. 1 and 2, that the errors of reflection of the two arrangements of the reflecting system are equal but have unlike signs.

Figure 5:
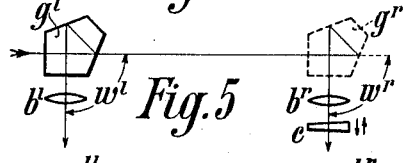
Figure 6:
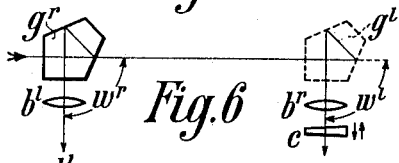

In Figs. 5 and 6 the members of the adjusting device consist of optical square prisms $g^l$ and $g^r$, to which the angles of deflection $w^l$ and $w^r$ are proper. The second arrangement of the reflecting system shown in Fig. 6 may be produced from that of Fig. 5 by interchanging the prisms. By this interchange, the angle $w^l$ is likewise exchanged for the angle $w^r$, so that the error of reflection $w^l - w^r$ is transformed into the other $w^r - w^l$. The same arrangement of the prisms is obtained by shifting each prism, without changing its level, before the other objective.

In the example of Figs. 7 and 8, as in Figs. 1 and 2, simple reflecting prisms $d^l$ and $d^r$ serve as members. The arrangement of the prisms shown in Fig. 8 may be derived from that of Fig. 7 through rotating the prism casing $e$ by 180° about an axis parallel to the incident pencils. This second arrangement is only effective, when—as shown in Fig. 8—pencils are received which proceed from the right hand, in other words only when on the right hand an opening for the entrance of pencils is provided and as set forth for the left hand side with reference to Figs. 3 and 4, either a collimator can be attached or a suitable distant object point exists. The errors of reflection are equal in magnitude for the same reasons as in the two first examples. They have also unlike signs, though there exists this difference from those examples, that the angle $v^l$ lies on the left and the angle $v^r$ on the right hand. The inversion of the signs, which occurs when the prisms are re-arranged, results in this case from the circumstance that, in consequence of the inversion of the incident pencils, the angles of deflection become situated on the other side of the emerging principal rays, so that they change their sign.

In Figs. 9 and 10 optical square prisms are the components of the pair of members. Changing from one arrangement to the other is, according to the drawing, connected with a change in level of the prisms. In this case the second arrangement is produced through a rotation of each prism by 180° about the axis of its objective. The same re-arrangement, but without a change in level of the prisms, is obtained by rotating each prism by 90° in the principal plane of reflection. In this example also, the correct effect of the re-arrangement is produced by inverting the direction of entrance of the pencils.

In the examples Figs. 11 to 18, reflecting systems consisting of a double member are employed. In Figs. 11 and 12 the double member is composed of simple reflecting prisms and arranged as an adjusting device in front of a telemeter. In Fig. 11, the lower one of the two incident parallel pencils, which lie closely one above the other, enters directly the lower half of the objective $b^r$, the upper one is at first deflected by the angle $u^r$ through the prism $d^r$ and hereafter through the prism $d^l$ in the opposite direction by the angle $u^l$ toward the objective $b^l$. When the prism casing $e$ is rotated by 180° about an axis directed on a level with the objective axes from one to the other prism, the arrangement of the reflecting system as shown in Fig. 12 is attained. It is seen from this figure, that immediately above and below the axis of the objective $b^l$ two incident parallel pencils are available, the lower one of which is led through the prisms to the objective $b^r$. In both arrangements, the error of reflection depends only upon the double reflection of the one pencil, the other pencil undergoing no change of direction. Hence, the error of reflection is in Fig. 11: $u^r - u^l$, and in Fig. 12: $v^l - v^r$. Since again, as in the first example, $v^l - v^r$ is equal to $u^l - u^r$, the two errors of reflection differ from one another by the sign only. The example of Figs. 13 and 14 differs from the preceding one by the double member being composed of optical square prisms. The transformation of one arrangement of the reflecting system into the other may be effected through a rotation of both prisms by 180° about an axis, which is directed from one prism to the other in level with the objective axes. The same re-arrangement, but without a change in level, and the same effect is attained, when each prism is separately rotated by 90° in the principal plane of reflection. The error of reflection is in the first arrangement of the prisms $w^r-w^l$ and in the second $w^l-w^r$. In the telemeter of Figs. 15 and 16, the two telescope systems are united similarly as in the example Figs. 1 and 2, the only difference being that in the present case the objective is to be divided through a horizontal diameter into the two halves belonging to one and the other system. The two pencils have a difference in level equal to the half diameter of the objective. The one pencil impinges immediately on the lower half of the objective, the other pencil is led through the double member to the upper half of the objective. The members of the reflecting system are simple reflecting prisms $d^l$ and $d^r$. A rotation of the prism casing $e$ by 180° in the principal plane of reflection produces from the one arrangement the other. If optical squares be the components of the double member, their interchange would result in the correct re-arrangement. As to the errors of reflection, the same applies as in the example Figs. 11 and 12, when simple reflectors are used, and the same as in the example Figs. 13 and 14, when optical squares are employed. The case of Figs. 17 and 18 differs from those dealt with in Figs. 11 and 12 as well as 13 and 14 in that the position of the incident pencils is not to be altered. Since optical square prisms are chosen as members of the reflecting system, transforming one arrangement into the other requires that the prisms are interchanged, that is to say, that each prism is brought to the place and the position of the other. This interchange corresponds to a rotation of the double member by 180° in the principal plane of reflection. The same rotation characterizes the correct re-arrangement if the members have only simple reflecting surfaces. The error of reflection in the arrangement Fig. 17 is $w^r-w^l$, and in the arrangement Fig. 18 it is $w^l-w^r$.

In Figs. 19 and 20 the incident pencils, which may be produced in a collimator, lie closely side by side. According to Fig. 19, the left pencil passes through the simple reflecting prisms $d^l_1$ and $d^l_2$ forming the left double member and undergoes in this way the contrary deflections $u^l_1$ and $u^l_2$. The right pencil passing through the prisms $d^r_1$ and $d^r_2$ undergoes the deflections $u^r_1$ and $u^r_2$. The error of reflection is $$u^l_1-u^l_2-u^r_1+u^r_2.$$

The re-arrangement of the reflecting system, Fig. 20, might be produced through a rotation of the prism casings $e^l$ and $e^r$ by 180° in the principal plane of reflection. The error of reflection is hereby changed to $$v^l_2-v^l_1-v^r_2+v^r_1.$$

In accordance with former explications $v^l_1-v^l_2$ is equal to $u^l_1-u^l_2$ and $v^r_1-v^r_2$ equal to $u^r_1-u^r_2$. Hence, the error of reflection of the arrangement in Fig. 20 differs from that in Fig. 19 by the sign only.

In the telemeter shown in Figs. 21 and 22 the two objectives lie closely side by side behind the two double members, which reduce the distance between the incident pencils from the length of the base line to the distance between the objectives. Each double member is composed of two optical squares, the left one of $g^l_1$ and $g^l_2$, the right one of $g^r_1$ and $g^r_2$. To transform the arrangement of Fig. 21 into that of Fig. 22, each double member may be rotated by 180° in the principal plane of reflection or the left members interchanged as well as the right ones. The error of reflection in Fig. 21 is $$w^l_1-w^l_2-w^r_1+w^r_2$$

and that in Fig. 22 is $$w^l_2-w^l_1-w^r_2+w^r_1,$$

so that both differ in sign only.

In the telemeter of Figs. 23 and 24, the reflecting system which serves as the horizontal base line is not placed immediately in front of the objective $b$, as in Figs. 1 and 2, but between both a simple reflecting prism $h$ is located. As in the example just referred to, the reflecting system is a pair of members composed of two isosceles right angled reflecting prisms $d^l$ and $d^r$, which have totally reflecting hypotenusal surfaces and are fixed in a casing $i$. This casing has entrance openings on both sides abreast of the prisms and is rotatable about a vertical axis $j^0$ in the main casing $j$ of the telemeter, a snap device $i^0 j^1$ being employed to fix the casing $i$, after it has been brought, through a rotation by 180°, from the position of Fig. 23 into that of Fig. 24, or inversely. The reflecting system is, moreover, provided with a so-called compensator composed of two refracting prisms $k^1$ and $k^2$, which are geared together for equal, but opposite rotations and so arranged that the pencil system passing through them is deflected in the horizontal plane. Its object is to compensate the existing error of reflection. In Fig. 23 the said compensator influences the pencil system deflected by $d^r$, in Fig. 24 it acts to the same extent, but in opposite direction (the sign of the error of reflection is likewise contrary to that in Fig. 23) on the pencil system proceeding from $d^l$. By turning the operating wheel $k$ of the prisms $k^1$ and $k^2$, the degree of deflection produced can be regulated. As may be understood from Fig. 23, the pencil system reflected by $d^l$ enters the left half of the objective, that reflected by $d^r$ the right one. In order that the two images of the landscape—produced by the objective $b$ from the two pencil systems in the plane of the vertical wires $h^1$ and $h^r$—shall not coincide, there is fixed a partition $h^o$ in the casing $j$ following the vertical plane of the axis of the objective. In order that, moreover, these images show the same object—and this in such a manner that the two image points corresponding to an infinitely distant object point have the same distance between each other as the two wires $h^l$ and $h^r$—a refracting prism $l^o$ is placed in the path of the pencil system producing the right image. This prism serves at the same time as the optical component of the measuring device, which in addition thereto comprises a fixed scale $m$, a slide $l$ (carrying the prism $l^o$ and an index $l^1$), and a screw $n$ for displacing the slide $l$. A terrestrial ocular $o$ renders the optical equipment of the instrument complete. For measuring finite distances, the measuring device is to be operated, from the position shown where the index $l^1$ points to the scale stroke $\infty$, in such a direction that by approaching the prism $l^o$ to the wires $h^l$ $h^r$ the right image of the object point is moved to the left one. The amount, by which the distance between the right and the left image of the object point is diminished, is proportional to the displacement of the prism $l^o$. When this distance has become equal to the distance between the wires $h^l$ and $h^r$ (equal to the distance between the images of an infinitely distant object point when the measuring device is set to $\infty$ as shown) the displacement of the right image corresponds to the angle formed by the two pencils which travel from the object point to the prisms $d^l$ and $d^r$. This "parallactic" angle can therefore immediately be measured by the displacement of the prism $l^o$. The scale $m$, however, instead of being provided with an equal division for the parallactic angles, carries an unequal one for the distances of the object, which are determined on the one side by those angles and on the other side by the length of the base line. When the instrument is directed so that the left image of the object point coincides with the wire $h^l$, the distance can be read from the scale $m$ as soon as the right image of the object point is covered by the wire $h^r$. When the observer desires to test, whether the error of reflection of the reflecting system, formerly brought to zero by means of the compensator $k^1$ $k^2$, has changed, the casing $i$ is to be rotated from the position of Fig. 23 to that of Fig. 24. If the right image of the object point is again covered by the wire $h^r$, the error of reflection is still unaltered. But if this image lies on the right or the left side of the wire $h^r$, the change of the error of reflection so indicated is neutralized by operating the compensator, until the right image of the object point has traveled half the way to the wire $h^r$. The device has thus been re-adjusted, as the position of the right image of the object point remains unaltered, when the casing $i$ is turned back into the position Fig. 23. The previously inexact measuring is corrected by turning the screw $n$, until the right image of the object point is covered by the wire $h^r$. If the reflecting system be not provided with a compensator, two settings of the measuring device are required for determining the distance of an object, both causing the right image to coincide with the wire $h^r$, but one effected with the position of the casing $i$ shown in Fig. 23 and the other with that of Fig. 24. As the parallactic angle belonging to the object point is, in the one case, diminished by the error of reflection of the pair of members, in the other case, enhanced by the same error, the median position between the two positions of the index $l^1$ as set presents the distance of the object point.

The adjusting device according to Figs. 25 and 26 is designed to be placed, say on a stand, in front of any telemeter, for example that according to Fig. 23. The device is composed of two optical square prisms $g^l$ and $g^r$ having angles of deflection of about 90°, and forming a pair of members and of a collimator, that is to say, a collective lens $p$ and a mark $q$ in its focus. This mark may consist of a small aperture as shown. The casing $r$ of the collimator is rigidly connected with the main casing $s$ of the adjusting device carrying the prisms $g^l$ and $g^r$ by means of their mountings $t^l$ and $t^r$. The exit openings $s^l$ and $s^r$ of the adjusting device are supposed to be directed toward the entrance openings of the telemeter. The prisms $g^l$ and $g^r$ are arranged with different level so that the left one receives the lower and the right one the upper pencil of parallel rays produced by the collimator. The prisms deflect the pencils through the openings $s^l$ and $s^r$ into the left and the right telescope of the telemeter. The mountings $t^l$ and $t^r$, each together with its prism, can be interchanged. After such interchange, the left prism receives the upper and the right one the lower pencil, but this does not influence the distance between the two real images of the mark $q$ of the collimator, which are formed from these pencils in the telescopes of the telemeter. This distance between the mark images depends, on the contrary, only upon the error of reflection of the pair of members $g^l$ $g^r$. If the error of reflection is equal to zero, the mark $q$ represents an object point having the parallactic angle zero, that is to say, an infinitely distant object point, and the distance between the images is not altered by the interchange of the prisms. Furthermore, if for example the telemeter is provided in each image field with a fixed measuring-wire, as $h^l$ and $h^r$ in Fig. 23, and, in addition thereto, with a measuring device in the right telescope, as in this Fig. 23, it is exactly adjusted, when the measuring device indicates the distance ∞, after the instrument has been directed with the left wire $h^l$ to the mark image and thereafter the right mark image has been set to coincide with the wire $h^r$. When there exists an error of reflection, its sign changes by interchanging the prisms, and in consequence thereof the distance between the images is likewise altered. The mark represents, in one case, an object point of finite distance, the parallactic angle of which is equal to the unknown error of reflection; in the other case, an object point, which lying behind the telemeter has the same parallactic angle as the first object point, but with opposite direction. In the first case, the distance between the images exceeds, in proportion to the parallactic angle, the distance between the images of an infinitely distant object point; in the second case, it is by the same amount less than the latter distance. Hence, the telemeter is correctly adjusted, when the index of the measuring device, in the setting of the first case, deviates by as much from the scale stroke ∞ toward the side of the finite distances as, in the setting of the second case, in the opposite direction.

I claim:

1. The combination, with a front system of plane reflectors which consists of an even number of members arranged with a common principal plane of reflection and so as to change the distance between two parallel pencils of parallel rays, of two hinder telescope systems adapted each to receive one of the pencils, the members of the system of plane reflectors being mounted so as to allow a re-arrangement, after which the error of reflection of the system has the same value, but the contrary sign.

2. The combination, with a front system which consists of an even number of optical squares arranged with a common principal plane of reflection and so as to change the distance between two parallel pencils of parallel rays, of two hinder telescope systems adapted each to receive one of the pencils, the optical square prisms being mounted so as to allow a re-arrangement by interchange.

3. A device for adjusting telemeters, comprising a system of plane reflectors which consists of an even number of members arranged with a common principal plane of reflection and so as to change the distance between two neighboring pencils of parallel rays to an amount equal to the length of the base line of the telemeter, the members of the system of plane reflectors being mounted so as to allow a re-arrangement, after which the error of reflection of the system has the same value, but the contrary sign.

OTTO EPPENSTEIN.

Witnesses:
   PAUL KRÜGER,
   FRITZ SANDER.